United States Patent
Erikson et al.

(10) Patent No.: US 7,219,570 B2
(45) Date of Patent: May 22, 2007

(54) LONG-SPAN LEAD SCREW ASSEMBLY WITH ANTI-BACKLASH NUT

(75) Inventors: Keith W. Erikson, Hollis, NH (US); Kenneth W. Erikson, Amherst, NH (US)

(73) Assignee: Kerk Motion Products, Inc., Hollis, NH (US)

( * ) Notice: Subject to any disclaimer, the term of this patent is extended or adjusted under 35 U.S.C. 154(b) by 582 days.

(21) Appl. No.: 10/781,335

(22) Filed: Feb. 17, 2004

(65) Prior Publication Data

US 2005/0178225 A1    Aug. 18, 2005

(51) Int. Cl.
*F16H 27/02*    (2006.01)

(52) U.S. Cl. .................. 74/89.42; 74/424.72

(58) Field of Classification Search ........... 74/89.42, 74/424.71, 424.72
See application file for complete search history.

(56) References Cited

U.S. PATENT DOCUMENTS

| | | | |
|---|---|---|---|
| 4,131,031 A | 12/1978 | Erikson et al. | |
| 4,210,033 A | 7/1980 | Erikson et al. | |
| 4,249,426 A | 2/1981 | Erikson et al. | |
| 4,353,264 A | 10/1982 | Erikson et al. | |
| 4,566,345 A | 1/1986 | Erikson et al. | |
| 4,974,464 A | 12/1990 | Erikson et al. | |
| 5,027,671 A | 7/1991 | Erikson et al. | |
| 5,079,963 A * | 1/1992 | Yamamoto et al. | 74/424.75 |
| 5,601,372 A | 2/1997 | Erikson et al. | |
| 5,689,997 A * | 11/1997 | Schaller | 74/335 |
| 5,732,596 A | 3/1998 | Erikson et al. | |
| 5,852,949 A * | 12/1998 | Cartensen | 74/424.94 |
| 5,913,940 A | 6/1999 | Erikson et al. | |
| 5,913,941 A | 6/1999 | Erikson et al. | |
| 5,937,702 A | 8/1999 | Erikson et al. | |
| 6,041,671 A | 3/2000 | Erikson et al. | |
| 6,099,166 A | 8/2000 | Erikson et al. | |

(Continued)

*Primary Examiner*—David M. Fenstermacher
(74) *Attorney, Agent, or Firm*—Hamilton, Brook, Smith & Reynolds, P.C.

(57) ABSTRACT

A lead screw assembly having a lead screw rotatable within a hollow tubular portion of a reinforcing rail. A nut engages with threads of the lead screw and is movable along the reinforcing rail. The lead screw includes plurality of first threaded portions having an outer diameter and extending lengthwise of the lead screw; and at least one second gap portion having an outer diameter that is less than the outer diameter of the first threaded portions. The second gap portion is positioned between adjacent first threaded portions of the lead screw. At least one generally U-shaped bearing is secured within the reinforcing rail and contacts the lead screw at a second gap portion. Each U-shaped bearing supports the lead screw along its length as the screw rotates within the rail, so that the lead screw assembly can be safely operated at high speeds over comparatively long distances while minimizing whipping and vibration of the lead screw. The reinforcing rail can include a base portion which permits the assembly to be securely mounted to a support structure at any convenient location along its length.

An anti-backlash nut assembly includes a threaded follower for engagement with the threads of a lead screw. A pair of wedges bias the follower in a radial direction so that the threads of the follower are brought into forcible engagement with the mating threads of the screw. In a preferred embodiment, the nut assembly is adjustable to provide variable levels of backlash resistance and wear-compensation.

38 Claims, 7 Drawing Sheets

U.S. PATENT DOCUMENTS

| | | |
|---|---|---|
| 6,117,249 A | 9/2000 | Erikson et al. |
| 6,131,478 A | 10/2000 | Erikson et al. |
| 6,202,500 B1 | 3/2001 | Erikson et al. |
| 6,240,798 B1 | 6/2001 | Erikson et al. |
| 6,415,673 B1 | 7/2002 | Erikson et al. |
| 6,422,101 B2 | 7/2002 | Erikson et al. |
| 6,467,362 B2 | 10/2002 | Erikson et al. |

* cited by examiner

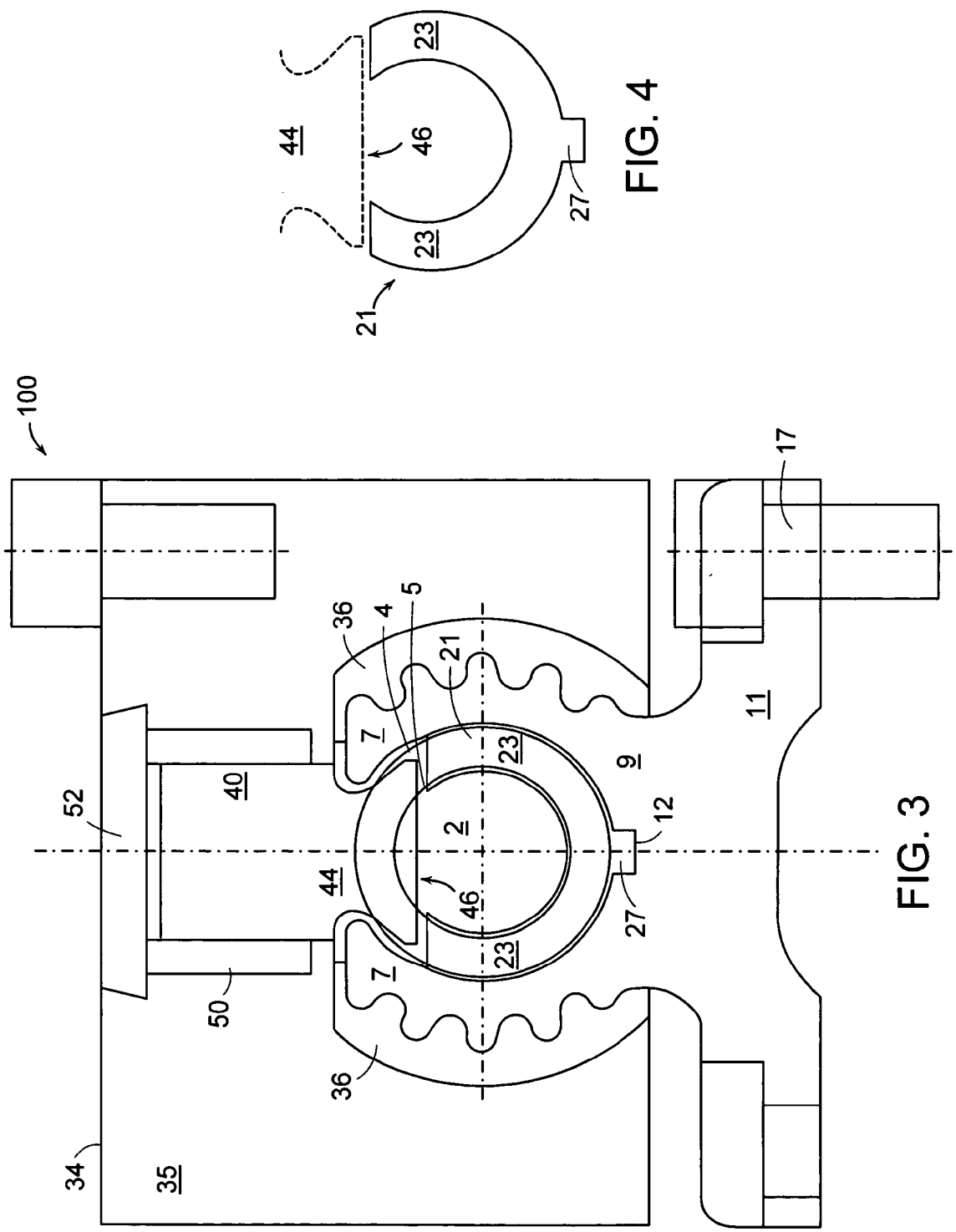

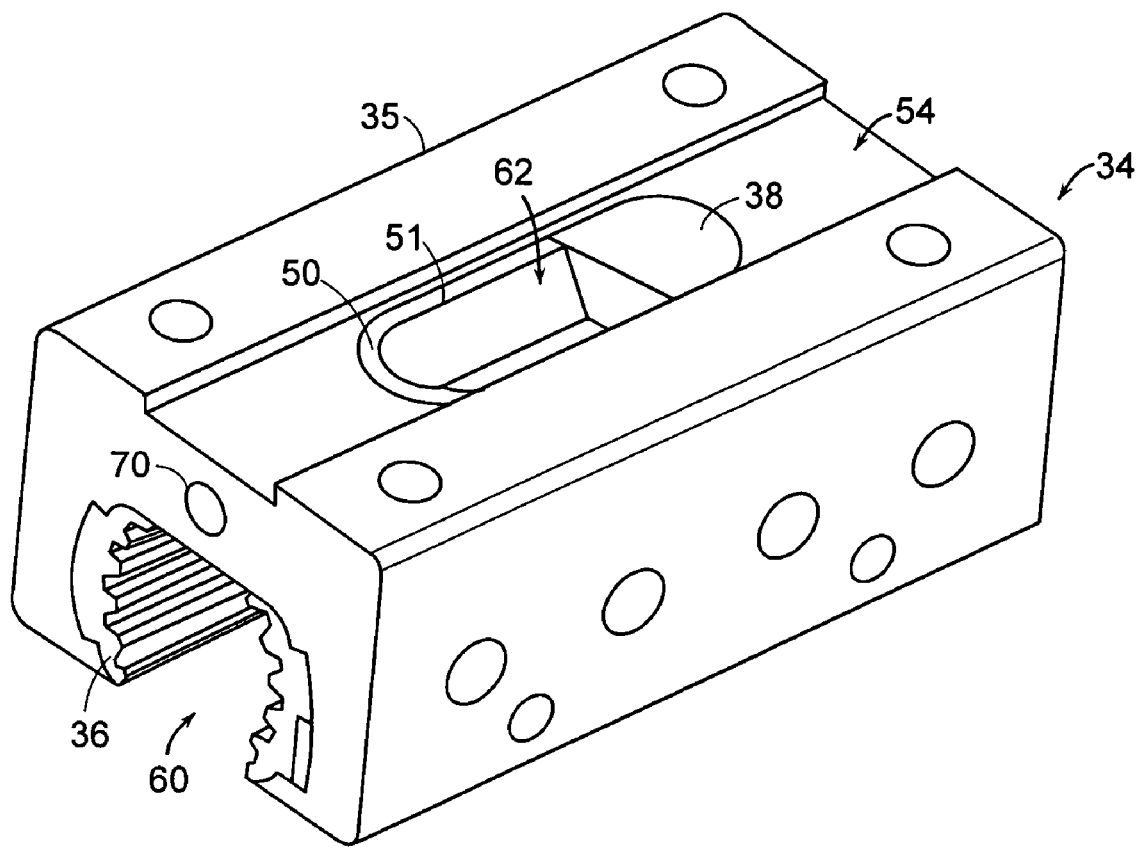
FIG. 5
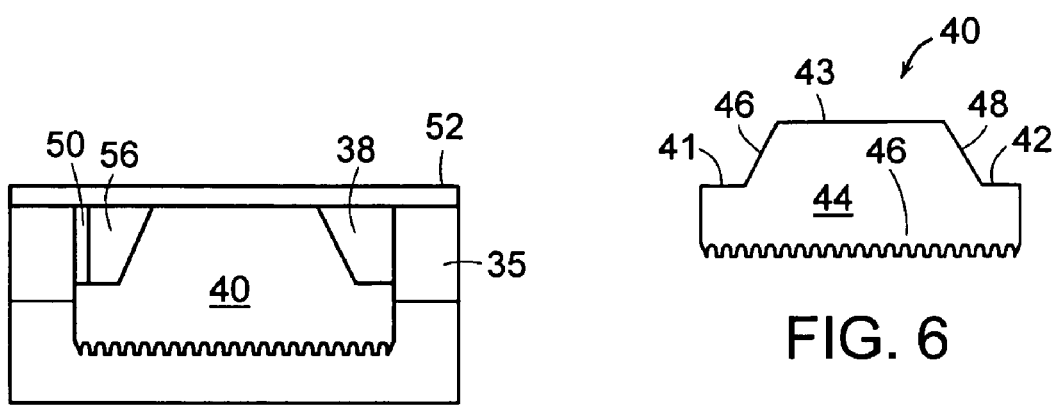
FIG. 6
FIG. 7

LONG-SPAN LEAD SCREW ASSEMBLY WITH ANTI-BACKLASH NUT

BACKGROUND OF THE INVENTION

Devices and methods for bilateral motion of a load are known which utilize a rotating lead screw and a threaded nut that is driven by the lead screw. In U.S. Pat. No. 6,422,101, issued Jul. 23, 2002 to the present inventors, the entire teachings of which are incorporated herein by reference, a lead screw assembly is described which employs an anti-backlash nut assembly on a rotating lead screw. A hollow, elongated reinforcing rail extends lengthwise of and surrounds the lead screw. The reinforcing rail has a slot extending lengthwise of the central axis of the lead screw. The anti-backlash nut assembly has a nut which completely surrounds the outer diameter of the reinforcing rail, and is movable along the length of the reinforcing rail. The anti-backlash nut has a pair of threaded tongue portions which extend radially through the slot to engage the threads of the lead screw for moving the nut in reciprocating motion lengthwise of the rail. A load or tool can be mounted to the nut for reciprocating motion along the length of the assembly.

A lead screw assembly such as described in U.S. Pat. No. 6,422,101 is particularly advantageous for applications in which a high degree of spacial resolution in the reciprocating motion of a load is desired. However, the operation of any lead screw device is limited by the "critical speed" of the screw shaft. Beyond a certain critical speed, the rotation of the screw within the reinforcing rail becomes unstable. This critical speed is a function of both the length of the assembly and the diameter of the screw shaft. Thus, in the case of a four foot shaft with a ⅜ inch outer diameter, for instance, the "critical speed" is approximately 680 revolutions-per-minute (RPM). Beyond this speed, whipping and vibration forces become excessive, and the apparatus can self-destruct. In practice, this phenomena generally restricts the operation of the lead screw assembly to lower speeds over relatively short spans. It would be desirable to provide a lead screw assembly that can successfully reciprocate a load at high speeds over relatively long distances.

SUMMARY OF THE INVENTION

In one aspect, the present invention relates to a lead screw assembly which comprises a lead screw rotatable about a central axis and a reinforcing rail having a hollow tubular portion surrounding the lead screw and a slot extending lengthwise of the central axis. The lead screw includes plurality of first threaded portions having an outer diameter and extending lengthwise of the lead screw; and at least one second gap portion having an outer diameter that is less than the outer diameter of the first threaded portions. The second gap portion is positioned between two first threaded portions of the lead screw. A nut is movable along the reinforcing rail, the nut having a tongue portion extending radially through the slot and engaging with threads on the lead screw. At least one generally U-shaped bearing is secured within the reinforcing rail and contacts the lead screw at a second gap portion. Each U-shaped bearing supports the lead screw along its length as the screw rotates within the rail, so that the lead screw assembly can be safely operated at high speeds while minimizing whipping and vibration of the lead screw.

In another aspect, the a lead screw assembly comprises a threaded lead screw and a reinforcing rail, where the reinforcing rail comprises a hollow tubular portion surrounding the lead screw and having a slot extending lengthwise of its central axis; and a base portion extending from the hollow tubular portion opposite the slot, the base portion adapted to secure the reinforcing rail to a support structure. The assembly further comprises a nut that is movable along the reinforcing rail, the nut having a threaded tongue portion extending radially through the slot being engageable with the threaded lead screw, so that the nut is moved in reciprocating motion along the rail when the screw is rotated. The base portion of the reinforcing rail permits the assembly to be securely mounted to a support structure at any convenient location along its length. Furthermore, the nut need not extend completely around the exterior of the reinforcing rail, so that the assembly requires minimal clearance space for the movement of the nut, and can be made more compact.

In yet another aspect, the invention relates to an anti-backlash nut assembly comprising a nut body having a central cavity for engagement with a reinforcing rail and a threaded follower within the nut body. A pair of wedges bias the follower in a radial direction so that the threads of the follower are brought into forcible engagement with mating threads on a lead screw. In a preferred embodiment, the nut assembly is adjustable to provide variable levels of backlash resistance and wear-compensation. In one aspect, the nut assembly is adjusted using a pair of set screws, and optionally an elastic member, which engage the wedges and control the bias force on the follower.

In yet another aspect, the invention relates to a method for bilateral translation of a nut assembly, which comprises, inter alia, securing a gap portion of a lead screw within a reinforcing rail using a generally U-shaped bearing; and rotating the lead screw within the reinforcing rail to cause the nut assembly to move along the reinforcing rail.

The invention further relates to a method of operating an anti-backlash nut assembly which comprises providing a nut assembly with a threaded follower and a pair of wedges, and pre-loading the wedges against the follower to force the threads of the follower into forcible engagement with mating threads of the lead screw. The bias force against the follower is preferably adjusted using set screws and optionally an elastic member to provide variable levels of backlash-resistance and wear-compensation.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3 is a cross-sectional view of a reinforced lead screw assembly of the invention;

FIG. 4 is a side view of a generally U-shaped bearing according to one aspect of the invention;

FIG. 5 is a perspective view of an anti-backlash nut assembly according to one aspect of the invention;

FIG. 6 is a side view of a threaded nut follower;

FIG. 7 is a side cross-section of an anti-backlash nut with threaded follower;

DETAILED DESCRIPTION OF THE INVENTION

A description of preferred embodiments of the invention follows.

Figure 1A:
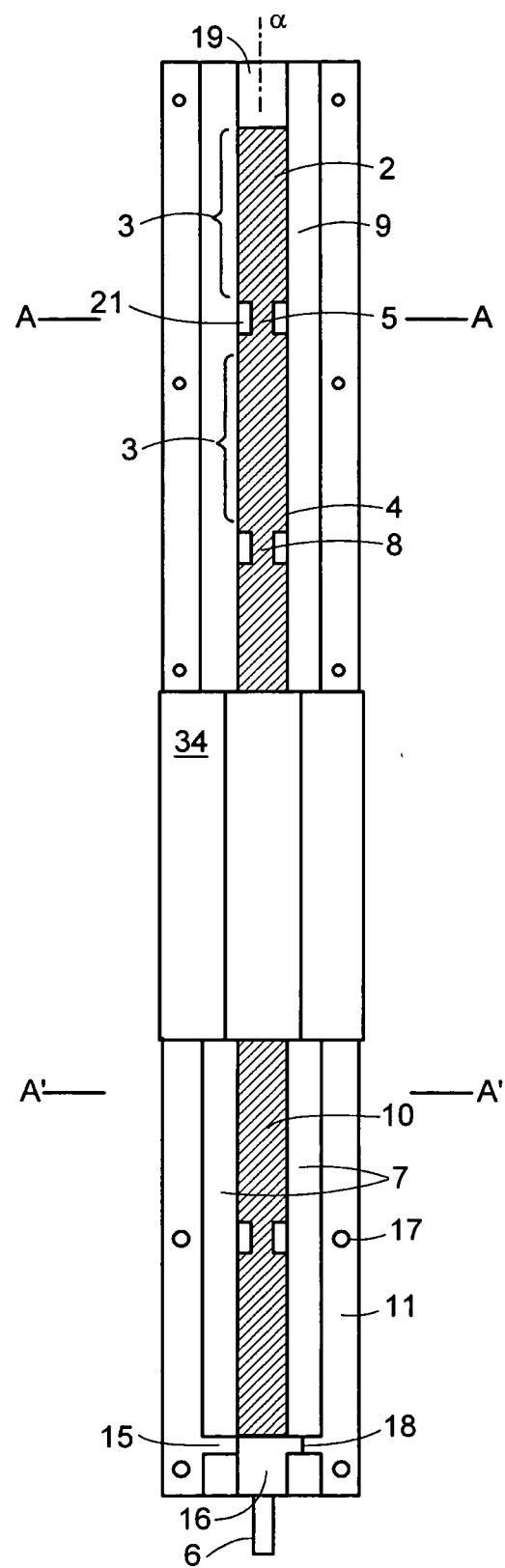
FIG. 1A is a plan view of a reinforced lead screw assembly according to one embodiment of the present invention.

A reinforced lead screw assembly 100 according to one embodiment of the invention is seen assembled in plan view in FIG. 1A. A section of the assembly 100 between A—A and A'—A' is shown in perspective view in FIG. 2. The lead screw assembly 100 includes a lead screw 2 that is rotatable about an axis, α. A projection 6 is formed on one end of the lead screw 2 to connect it to a reversible driving motor (not shown) in order to rotate the lead screw 2 alternatively in clockwise and counterclockwise direction. The lead screw 2 can be made from any suitable material, such as steel. The screw could also be aluminum, for example.

The screw 2 includes a plurality of first threaded portions 3 which run along the length of the screw. The threaded portions 3 include threads 4 having a first diameter. Between each of the first threaded portions 3 are second gap portions 5. The gap portions 5 preferably include threads 8 having a second diameter that is less than the diameter of the threads 4 on the threaded portions 3. Alternatively, the gap portions 5 can be unthreaded. Contacting the screw shaft at each gap portion 5 is a generally U-shaped bearing 21 which will be described in greater detail below.

An elongated reinforcing rail 9 extends lengthwise of the screw 2. (The reinforcing rail 9 without a lead screw is shown in perspective view in FIG. 1B). The reinforcing rail 9 includes a hollow tubular portion which receives the lead screw 2, and a slot 10 extending lengthwise and parallel to the central axis α of the lead screw 2. The hollow tubular portion is defined by side walls 7, which may constitute splined bearing surfaces. The lead screw 2 is journaled within the tubular portion of the reinforcing rail 9 by bearings 16 and 19 so that the screw may be rotated relative to the reinforcing rail 9.

Figure 2:
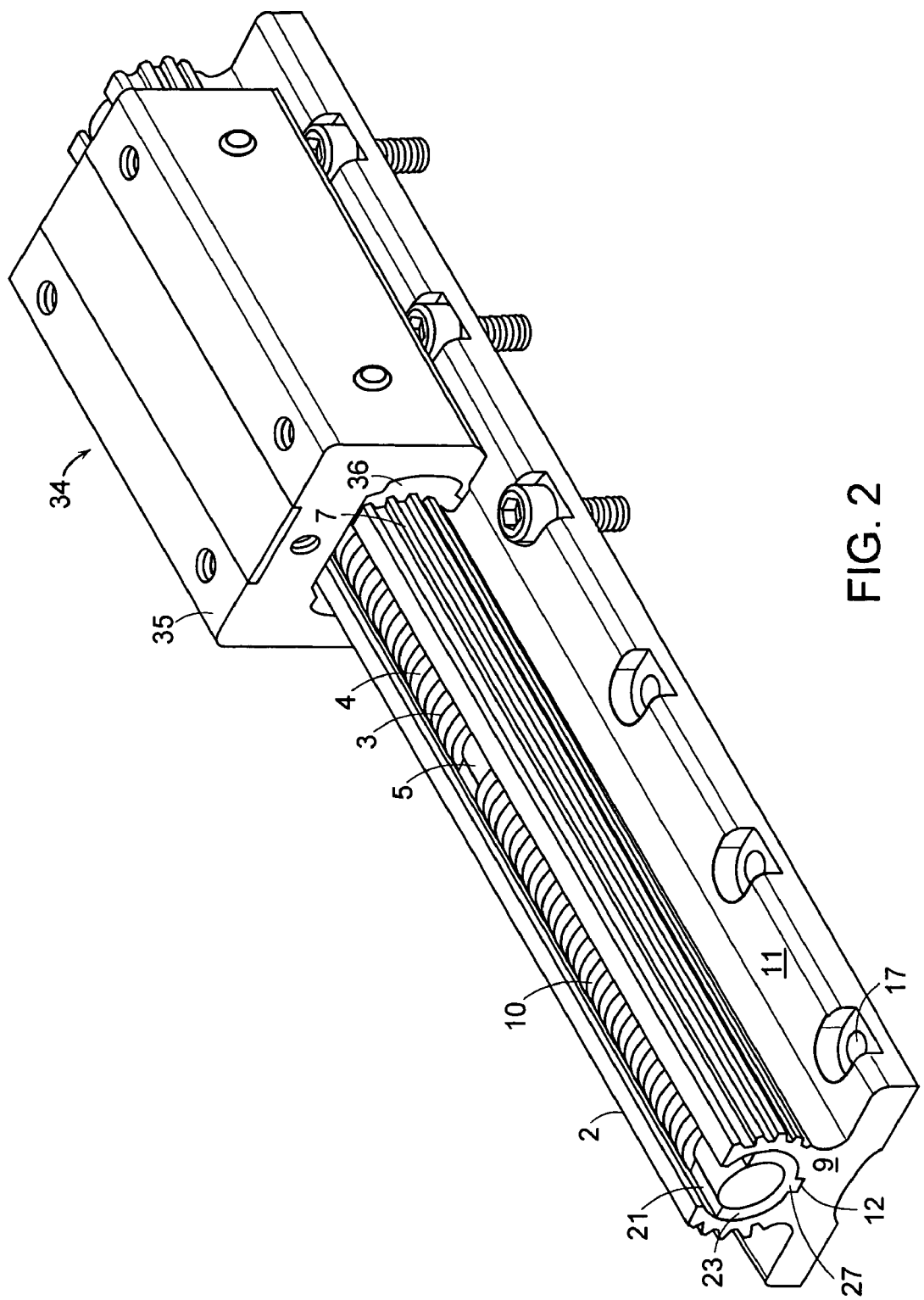
FIG. 2 is a perspective view of a section of the assembly of FIG. 1A.

As shown in FIG. 2, the reinforcing rail 9 also includes a base portion 11 which extends out from the hollow tubular portion opposite the slot 10. The base portion 11 can be provided with fastening holes 17 for securing the apparatus to a support structure (not shown). In operation, the base portion 11 would be secured in a machine structure with a reversible driving motor attached to the lead screw 2.

The reinforcing rail 9 can be made from any suitable material. In a preferred embodiment, the reinforcing rail is made from aluminum, which can be extruded into the shape of the rail 9.

A nut, which in this embodiment is an anti-backlash nut 34, is movable in bilateral direction along the reinforcing rail 9. In this embodiment, the nut 34 has a generally rectangularly-shaped body 35 that extends over the hollow, tubular portion of the reinforcing rail 9. Inside the nut body is a threaded follower 40 (see FIG. 3) that extends into the slot 10 of the reinforcing rail 9 to engage with the threads 4 of the rail, as will be described in greater detail below. The interior of the nut body includes bearing surfaces 36 (see FIG. 2), which can be made from a self-lubricating plastic material, and which are configured to mate with the splined side walls 7 of the reinforcing rail. A load or tool can be secured to the nut body in any convenient manner. The load with the anti-backlash nut 34 is reciprocated back and forth over the reinforcing rail 9 by the rotation of the reinforced lead screw 2.

As distinguished from conventional lead screw assemblies, such as described in U.S. Pat. No. 6,422,101, the nut 34 in this embodiment does not extend completely around the outer circumference of the reinforcing rail 9. Instead, the nut 34 extends only over the hollow tubular portion of the rail 9, as defined by side walls 7. The rail 9 further includes a wide base portion 11 extending out from the tubular portion opposite the nut 34. This is a particularly advantageous design, since it permits the reinforcing rail 9 to be securely mounted to a support structure via the wide base portion 11 at any convenient location along its length. Furthermore, since the nut 34 does not extend completely around the exterior of the reinforcing rail 9, the assembly requires less clearance space for the movement of the nut 34. The lead screw assembly of the invention is thus able to provide greater stability in a more compact design than comparative devices of the prior art.

Figure 1B:
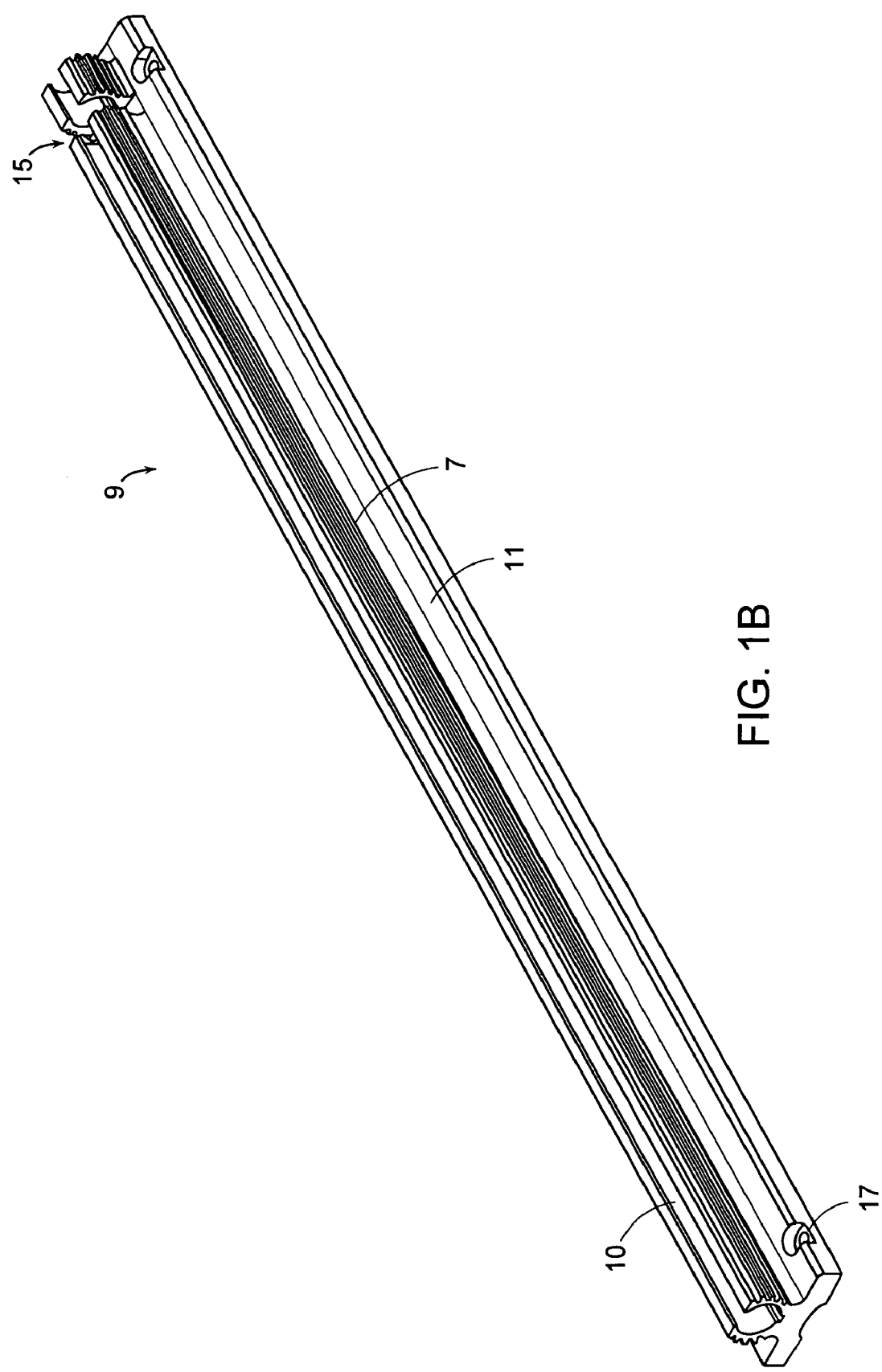
FIG. 1B is a perspective view of a reinforced rail.

As illustrated in FIGS. 1A and 1B, the side walls 7 of the reinforcing rail 9 are provided with a slot 15 proximate to one end of the rail. Bearing 16 includes a protrusion 18 which fits into the slot 15 to assist in anchoring the bearing 16 and screw 2 within the hollow portion of the rail 9. The slot 15 advantageously isolates the bearing 16 from the portion of the rail 9 over which the nut 34 travels. Thus, if the bearing 16 expands due to thermal expansion, for example, any expansion of the side walls 7 exterior to the bearing 16 will have no effect on the portion of the rail 9 over which the nut travels. At the other end of the assembly, bearing 19 is not anchored to the rail 9. Thus, if the screw 2 expands or contracts in length relative to the rail 9 due to thermal expansion effects, for instance, the free-floating bearing 19 can move in conjunction with the expansion or contraction of the screw. In this way, stress and buckling of the screw 2 and/or the rail 9 can be avoided.

Turning now to FIG. 3, a cross-sectional view of a lead screw assembly 100 with anti-backlash nut 34 according to one embodiment of the invention is shown. The nut 34 is shown in engagement with a gap portion 5 of the lead screw 2. As illustrated in FIG. 3, the outer diameter of the screw 2 at the gap portion 5 is significantly less than the outer diameter of the threads 4 at the first threaded portions 3. The reinforcing rail 9 includes a slot 12 that extends lengthwise along the bottom of the hollow portion of the rail 9 (see FIG. 2). The generally U-shaped bearing 21 includes a protrusion 27 which fits into the slot 12 at the bottom of the rail 9. The protrusion 27 thus anchors the bearing 21 to the rail 9 to prohibit the bearing 21 from rotating relative to the rail 9. It will be understood that any convenient means for anchoring the bearing 21 within the rail 9 can be employed. For example, the rail 9 could include a protrusion which fits within a corresponding notch on the bearing.

The gap portion 5 of the lead screw 2 is journaled within the U-shaped bearing 21. The U-shaped bearing 21, being anchored to the rail 9 by protrusion 27 and slot 12, supports the lead screw 2 within the rail 9, while permitting the screw 2 to rotate within the bearing 21. Preferably, as shown in FIGS. 1 and 2, this gap portion 5 and U-shaped bearing 21 arrangement is repeated at various locations along the length of the assembly. At each location, the U-shaped bearing 21 provides additional support to the lead screw 2 as it rotates within the rail 9, thus minimizing any whipping or vibration of the rotating screw. The additional intermittent support provided by U-shaped bearings 21 effectively decouples each of the first threaded portions 4 from one another as the screw 2 rotates within the rail 9. Thus, the assembly can be operated over effectively longer spans at high rates of speed without encountering instability.

By way of example, a four foot long shaft having an outer diameter of 3/8 inches is normally limited by a "critical speed" of about 680 RPM. However, when the threaded shaft is intermittently necked and supported by U-shaped bearings 21 spaced at about 4 inch increments, as described above, the critical speed is greatly increased, and the apparatus can be safely operated at speeds of up to about 3000 RPM or more.

A U-shaped bearing 21 according to the invention is shown in greater detail in FIG. 4. In general, the bearing 21 includes a protrusion 27 and a pair of curved arms 21 extending upwards from the protrusion 27. The outer diameter of the curved arms 21 is approximately equal to the inner diameter of the side walls 7 of the reinforcing rail 9. The inner diameter of the bearing arms 21 is approximately equal to the outer diameter of the gap portion 5 of the lead screw 2. The bearings are preferably made from a self-lubricating plastic material, such as acetyl and graphite.

The operation of the lead screw assembly will now be described with reference to FIG. 3. As shown in FIG. 3, the follower 40 of the anti-backlash nut 34 has a tongue portion 44 that extends down from the nut 34, through the slot 10 of the reinforcing rail 9. The tongue portion 44 includes threads 46 on its bottom surface. The threads 46 engage mating threads 4 on a first threaded portion 3 of the lead screw 2, such that when the screw 2 is rotated, the rotation of the lead screw threads 4 with respect to the follower threads 46 causes the nut 34 to move along the length of the screw. The direction of the screw's rotation (i.e. clockwise or counter-clockwise) determines the direction in which the nut is translated. The nut 34 is guided along the rail 9 by the splined side walls 7 of the rail 9, which mate with bearing surfaces 36 on the interior of the nut 34.

Preferably, the threaded tongue portion 44 of the nut has a length that is greater than the length of the gap portions 5 of the lead screw 2, so that as the nut traverses along the length of the screw, a substantial portion of the threaded tongue 44 always remains engaged with one or more of the first threaded portions 4. However, when the nut 34 is partially over a gap portion 5 of the screw, the threads 46 of the tongue 44 can engage with smaller-diameter threads on the gap portion 5 of the screw. Alternatively, the gap portion 5 of the screw 2 may be unthreaded, in which case the nut 34 is driven exclusively by the engagement of the mating threads 4 and 46 on the first portion 3 of the screw and the tongue portion 44 of the follower 40, respectively.

As shown in FIG. 4, the curve side walls 23 of the U-shaped bearing 21 are sized to permit the tongue portion 44 of the nut follower 40 (shown in phantom) to freely travel over the gap portion.

FIG. 5 is a perspective view of an anti-backlash nut assembly 34 according to one aspect of the invention. The assembly 34 includes a generally rectangularly shaped body 35. The body 35 includes a hollow interior portion 60 with a pair of bearing surfaces 36 configured to mate with a reinforced guide rail 9, as described above. The body 35 also includes a generally oval-shaped opening 62 at the top of the body. At one end of the opening is a large, arcuate wedge 38, and at the opposite end is a U-shaped stop, or U-stop 50, with arms 51 extending around the circumference of the opening 62 to the large wedge 38. The top of the body 35 further includes a recessed portion 54 for receiving a cap (see 52 in FIG. 3). The front and rear faces of the body 35 can each include holes 70 for a set screw, the function of which will be described in detail below.

The anti-backlash nut assembly 34 also includes the aforementioned follower 40 which engages with the threads of a lead screw, as previously described in connection with FIG. 3. The follower 40 is positioned within the oval-shaped opening 62 of the nut body 35, so that the threaded tongue portion 44 of the follower extends into the hollow interior portion 60 of the body 35. An exemplary threaded nut follower 40 is shown in side view in FIG. 6. The follower 40 includes a flat top surface 43, and two sloping surfaces 45,46 extending from the top surface 43 to flat ledges 42, 41 at either end of the follower. The bottom of the follower includes tongue portion 44, which has a threaded bottom surface 46 for engagement with mating threads on a lead screw (not shown).

The fully assembled anti-backlash nut assembly is shown in cross-sectional side view in FIG. 7. As shown, the assembly includes the follower 40 mounted within the nut body 53 between the large wedge 38 and the U-stop 50. Between the follower 40 and the U-stop 50 is a second, small wedge 56. Large wedge 38 and small wedge 56 have sloped surfaces that abut the sloped surfaces 45, 46 of the follower. Preferably, the angles of the mating sloped surfaces of the wedges and the follower are supplementary with respect to one another. The bottom surfaces of large wedge 38 and small wedge 56 rest on the flat ledges 42, 41 of the follower. Cap 52 is secured across the top of the body 35 to secure the follower and wedges between the cap and the lead screw.

In operation, the wedges 38, 56 can be pre-loaded against the follower 40 such that the force from the sloped surfaces of the wedges 38, 40 continually forces the follower 40 down into engagement with the lead screw. Since the follower 40 is biased in a radial direction towards the lead screw, the threads 46 of the follower are continually forced into firm engagement with the flanks of the threads 4 of the lead screw. This forcible engagement of the mating threads prevents backlash while the anti-backlash nut translates bilaterally along the reinforcing rail 9.

Figure 8A:
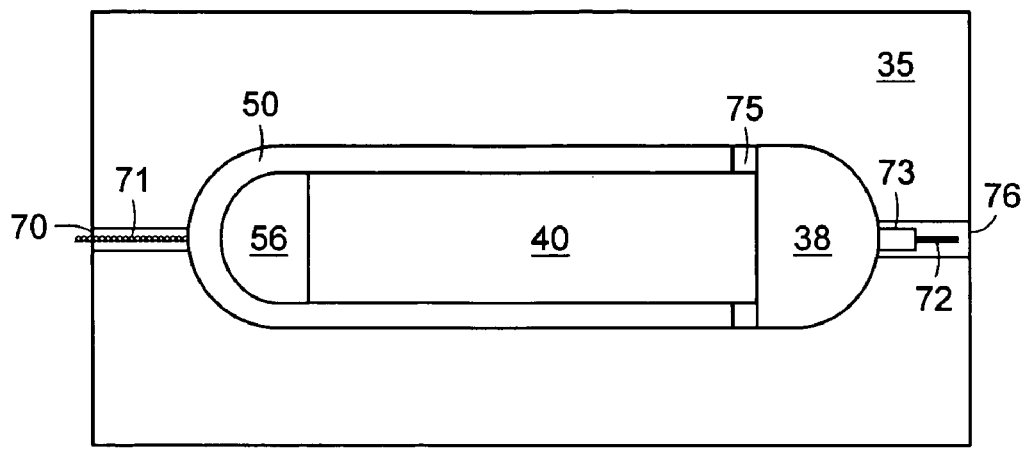
FIGS. 8A–8C are top views of an anti-backlash nut assembly with variable backlash control and wear resistance.
Figure 8B:
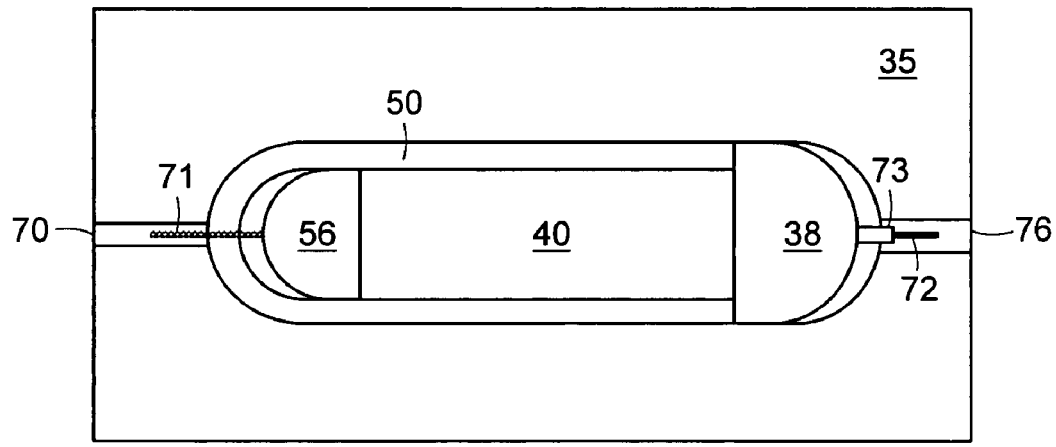
Figure 8C:
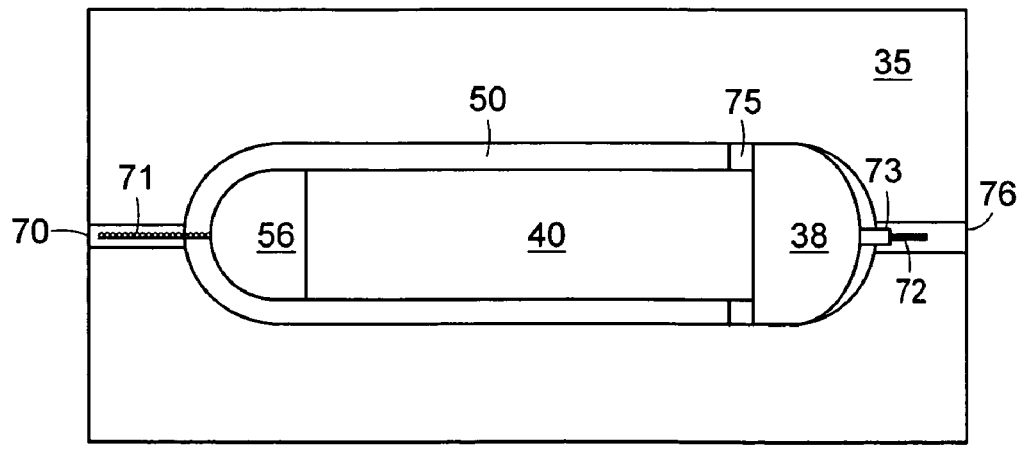

According to one aspect of the invention, the anti-backlash nut is adjustable to provide for variable degrees of both backlash control and wear-resistance. FIGS. 8A–8C are top views of an anti-backlash nut assembly 34 according to this preferred embodiment of the invention. The cap 52 is not shown to better illustrate the components of the assembly, though in operation the cap 52 would be present to secure the wedges and follower within the nut body.

As shown in FIG. 8A–8C, the nut assembly 34 can be adjusted to provide variable degrees of backlash resistance and wear compensation. As can be seen in the figures, the assembly includes a pair of set screws 71 and 72 in respective holes 70, 76 of the nut body 35. A first set screw 71 in first hole 70 is threaded-through U-stop 50 and can contact against small wedge 56. A second set screw 72 is located in second hole 76, and contacts against an elastic spring member 73, which is preferably made from an elastomeric rubber material. The elastic spring member could also be a wire spring, for example. The spring member 73 is also located in hole 76, and abuts against the large wedge 38. By adjusting the positions of the two set screws 71, 72, the pre-load applied by the wedges 38, 56 to the follower 40 can be adjusted to provide variable levels of backlash resistance and wear compensation.

In FIG. 8A, for instance, the set screws 71, 72 are adjusted to provide no pre-load between the wedges 38, 56 and the follower 40. Therefore, there is no anti-backlash function and no wear compensation with this setting. This would be desirable, for instance, in applications requiring low torque where a certain degree of slack or backlash between the threads of the follower and the threads of the screw is tolerable.

The assembly of FIG. 8A can be easily adjusted to provide an anti-backlash function, as shown in FIG. 8B. Here, the first set screw 71 is adjusted to back the small wedge 56 away from the large wedge 38. Next, the second set screw 72 is adjusted to move the spring member 73 tight against the large wedge 38. This pre-loads the large wedge 38 heavily against the U-stop 50, thus eliminating the gap 75 between these components (see FIG. 8A). The first set screw 71 can then be adjusted to vary the pre-load between the wedges 56, 38 and the follower 40. The pre-load between these components determines the degree of backlash-resistance for the nut.

In a third example, shown in FIG. 8C, the variable backlash-resistance can be combined with a wear-compensation function. Wear-compensation may be desirable for applications in which the nut will have an extended length-of-service. As the nut operates over a prolonged period of time, wear will inevitably occur in the threads of the nut, thus increasing the backlash of the system. This can be easily compensated for as shown in FIG. 8C. Here, the first set screw 71 is moved forward to create a gap 75 between the U-stop 50 and the large wedge 38. The second set screw 72 is also moved forward to bias the elastic member 73 against the large wedge 38. In this mode, the wedges 38 and 56 are both pre-loaded against the follower to provide backlash resistance. In addition, since the large wedge 38 is biased against the follower 40 by elastic member 73, any wear to the threads of the follower 40 will be compensated for by the force of the large wedge 38 against the follower 40. The large wedge 38 will thus continue to bias the follower 40 radially downward to take up any slack in the threads due to wear. This wear compensation will continue over time until eventually the large wedge 38 abuts the U-stop 50. In this mode, the gap 75 between the large wedge 38 and the U-stop 50 determines the amount of wear-compensation of the system.

Figure 9:
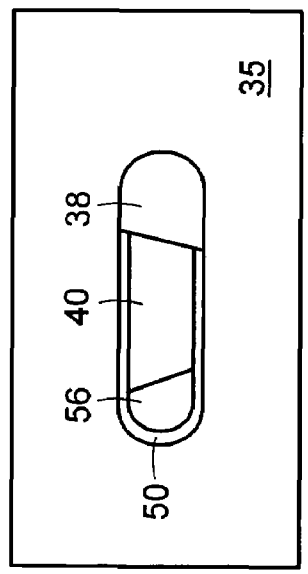
FIG. 9 is a top view of an anti-backlash nut assembly with wedges designed to bias a follower to a side of the assembly.

Various other modifications can be made to the anti-backlash nut of the present invention. For instance, as shown in FIG. 9, the follower 40 and wedges 38 and 56 can be designed to bias the follower to a side of the nut body 35. Here, the wedges 38 and 56 are formed at an angle, so that when the are pre-loaded against the follower 40, the follower is pushed against one side of the U-stop. This further aids in minimizing backlash between the respective threads of the follower and the lead screw.

Figure 10B:
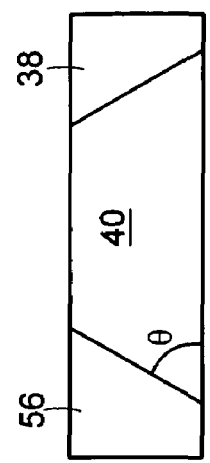
FIGS. 10A–10B schematically illustrate an anti-backlash nut assembly in which the angle of interface between a threaded follower and a pair of bias wedges is selected to be approximately equal to the angle of the threads of a lead screw.
Figure 10A:
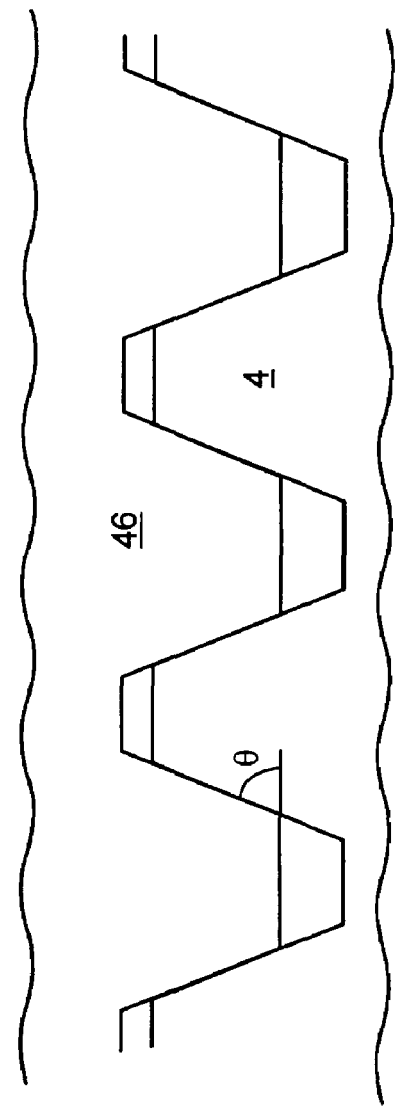

According to yet another aspect, the angle(s) of sloped surfaces of the follower 40 and wedges 38, 56 can be selected to have approximately the same angle as the flanks of the threads of the lead screw. FIG. 10A shows a plurality of threads 46 on the follower in engagement with mating threads 4 on a lead screw. FIG. 10B shows the follower 40 under bias by wedge members 38 and 56. By selecting the angle contact between the wedges 38, 56 and the follower 40 to be approximately equal to the angle of contact between the mating threads 4 and 46, the vector forces of the anti-backlash nut assembly can be effectively balanced. This helps to prevent the forces from pushing the follower away from the lead screw, and assists in maintaining secure engagement between the mating threads of the follower and the screw.

While this invention has been particularly shown and described with references to preferred embodiments thereof, it will be understood by those skilled in the art that various changes in form and details may be made therein without departing from the scope of the invention encompassed by the appended claims.

What is claimed is:

1. A lead screw assembly, comprising:
   a lead screw rotatable about a central axis and comprising:
      a plurality of first threaded portions having an outer diameter and extending lengthwise of the lead screw; and
      at least one second gap portion having an outer diameter that is less than the outer diameter of the first threaded portions, the second gap portion being positioned between two adjacent first threaded portions;
   a reinforcing rail comprising a hollow tubular portion surrounding the lead screw and having a slot extending lengthwise of the central axis; and
   at least one generally U-shaped bearing secured within the reinforcing rail and contacting the lead screw at a second gap portion.

2. The lead screw assembly of claim 1, further comprising:
   a nut assembly having a nut movable along the reinforcing rail, the nut having a tongue portion extending radially through the slot and having threads engageable with the first threaded portions of the lead screw for moving the nut in reciprocating motion lengthwise of the rail when the screw is rotated.

3. The lead screw assembly of claim 2, wherein the nut assembly comprises an anti-backlash nut.

4. The lead screw assembly of claim 1, wherein the reinforcing rail comprises a base portion extending from the hollow tubular portion of the reinforcing rail opposite the slot, the base portion adapted to secure the reinforcing rail to a support structure.

5. The lead screw assembly of claim 2, wherein the hollow tubular portion of the reinforcing rail comprises a pair of side walls having splined outer surfaces, the nut assembly having internal bearing surfaces configured to made with the splined outer surfaces of the side-walls.

6. The lead screw assembly of claim 5, wherein the ends of the lead screw are secured within the hollow tubular portion of the reinforcing rail by a pair of end bearings which surround the shaft of the lead screw, and permit the screw to be rotated within the rail.

7. The lead screw assembly of claim 6, wherein a first end bearing includes a protrusion which fits into a slot in the hollow tubular portion of the reinforcing rail to anchor the bearing within the rail.

8. The lead screw assembly of claim 7, wherein the slot in the hollow tubular portion extends substantially completely around the circumference of the hollow tubular portion to mechanically isolate the portion of the hollow tubular member containing the first end bearing from the portion of the hollow tubular member over which the nut assembly travels.

9. The lead screw assembly of claim 7, wherein the second end bearing is not anchored to the reinforcing rail, and can move within the rail to accommodate relative changes in the length of the lead screw or the rail.

10. The lead screw assembly of claim 1, further comprising means for anchoring the generally U-shaped bearing within the reinforcing rail.

11. The lead screw assembly of claim 10, wherein the anchoring means comprises a protrusion on the generally U-shaped bearing which fits into a recess on the interior of the hollow tubular portion of the reinforcing rail.

12. The lead screw assembly of claim 11, wherein the recess comprises a slot which runs lengthwise along the interior of the hollow tubular portion.

13. The lead screw assembly of claim 12, wherein the generally U-shaped bearing supports the gap portion of the lead screw so as to permit stable operation of the assembly at a speed that would otherwise be in excess of the "critical speed" of the lead screw assembly.

14. The lead screw assembly of claim 1, wherein the lead screw comprises steel.

15. The lead screw assembly of claim 1, wherein the reinforcing rail comprises aluminum.

16. A lead screw assembly, comprising:
a threaded lead screw rotatable about a central axis;
a reinforcing rail, comprising:
a hollow tubular portion surrounding the lead screw and having a slot extending lengthwise of the central axis; and
a base portion extending from the hollow tubular portion opposite the slot, the base portion adapted to secure the reinforcing rail to a support structure; and
a nut assembly having a nut movable along the hollow tubular portion of the reinforcing rail, the nut having a tongue portion extending radially through the slot and having threads engageable with the first threaded portions of the lead screw for moving the nut in reciprocating motion lengthwise of the rail when the screw is rotated.

17. The lead screw assembly of claim 16, wherein the hollow tubular portion of the reinforcing rail comprises a pair of side walls having splined outer surfaces, the nut assembly having internal bearing surfaces configured to made with the splined outer surfaces of the side-walls.

18. The lead screw assembly of claim 17, wherein the nut assembly extends substantially around the outer circumference of the hollow tubular portion, but not around the base portion of the reinforcing rail.

19. The lead screw assembly of claim 16, wherein the base portion comprises at least one flat surface extending at least partially along the length of the rail for securing the rail to a support structure.

20. An anti-backlash nut assembly, comprising:
a nut body having a central cavity for engagement with a reinforcing rail, the nut body comprising:
a follower within the nut body and having a tongue portion extending into the central cavity, the tongue portion having threads for engagement with a threaded lead screw rotatable within the reinforcing rail, the follower having first and second sloping surfaces at opposite ends of the follower;
a first wedge within the nut body, the first wedge having a sloping surface for engagement with the first sloping surface of the follower; and
a second wedge within the nut body, the second wedge having a sloping surface for engagement with the second sloping surface of the follower.

21. The anti-backlash nut assembly of claim 20, wherein the first wedge and the second wedge are preloaded against the sloping surfaces of the follower to force the threads of the tongue portion into forcible engagement with mating threads of a lead screw.

22. The anti-backlash nut assembly of claim 21, wherein the amount of pre-load between the wedges and the follower is adjustable to vary the level of backlash-resistance of the assembly.

23. The anti-backlash nut assembly of claim 20, further comprising a spring member within the nut body, the spring member configured to apply an adjustable bias force to the first wedge.

24. The anti-backlash nut assembly of claim 20, further comprising a pair of set screws within the nut body, the set screws configured to adjust the relative positions of the wedges within the nut body.

25. The anti-backlash nut assembly of claim 20, further comprising a cap which encloses the follower, the first wedge, and the second wedge within the nut body.

26. The anti-backlash nut assembly of claim 20, wherein the nut body comprises a generally oval-shaped opening extending from a first surface of the nut body to the central cavity, the follower, the first wedge, and the second wedge being housed within the generally-oval shaped opening.

27. The anti-backlash nut assembly of claim 26, further comprising a U-stop at a first end of the generally ovalshaped opening and extending partially around the interior of the generally oval-shaped opening.

28. The anti-backlash nut assembly of claim 27, wherein the first wedge is positioned at a second end of the generally oval-shaped opening, opposite the U-stop, and the second wedge is positioned within the generally oval-shaped opening between the U-stop and the follower.

29. The anti-backlash nut assembly of claim 28, further comprising:
a first set screw within the nut body, the first set screw configured to adjust the position of the first wedge; and
a second set screw within the nut body, the second set screw configured to adjust the position of the second wedge.

30. The anti-backlash nut assembly of claim 29, further comprising a spring member within the nut body, the spring member being positioned between the first set screw and the first wedge.

31. The anti-backlash nut assembly of claim 30, wherein spring member is adapted to bias the first wedge against either the follower or the U-stop to provide variable levels of backlash resistance and wear compensation.

32. The anti-backlash nut assembly of claim 30, wherein the spring member comprises an elastomeric material.

33. The anti-backlash nut assembly of claim 20, wherein the angle of the first sloping surface of the follower and the angle of the sloping surface of the first wedge are supplementary.

34. The anti-backlash nut assembly of claim 20, wherein the angle of the second sloping surface of the follower and the angle of the sloping surface of the second wedge are supplementary.

35. The anti-backlash nut assembly of claim 20, wherein the angles of interface between the sloped surfaces of the follower and the wedges are selected have approximately the same angle of interface as between the flanks of the threads on the lead screw and the follower.

36. The anti-backlash nut assembly of claim 28, wherein the wedge members are configured to bias the follower against a side surface of the generally oval-shaped opening to further minimize backlash between the threads of the follower and the threads of a lead screw.

37. A method for bilateral translation of a nut assembly, comprising:
- providing a lead screw having a plurality of first threaded portions having an outer diameter and extending lengthwise of the lead screw, and at least one second gap portion having an outer diameter that is less than the outer diameter of the first threaded portions, the second gap portion being positioned between two adjacent first threaded portions;
- providing a reinforcing rail comprising a hollow tubular portion surrounding the lead screw and having a slot extending lengthwise of the central axis;
- securing the second gap portion of the lead screw to the reinforcing rail with a generally U-shaped bearing;
- providing a nut assembly having a nut movable along the reinforcing rail, and a threaded portion engageable with the threads of the lead screw; and
- rotating the lead screw within the reinforcing rail to cause the nut assembly to move along the reinforcing rail.

38. The method of claim 37, wherein the generally U-shaped bearing supports the gap portion of the lead screw in such a manner as to permit the lead screw to be rotated at a speed that would be in excess of the "critical speed" of the lead screw assembly if the generally U-shaped bearing was not present.

* * * * *

UNITED STATES PATENT AND TRADEMARK OFFICE
CERTIFICATE OF CORRECTION

PATENT NO. : 7,219,570 B2 Page 1 of 1
APPLICATION NO. : 10/781335
DATED : May 22, 2007
INVENTOR(S) : Keith W. Erikson and Kenneth W. Erikson It is certified that error appears in the above-identified patent and that said Letters Patent is hereby corrected as shown below:

Column 8
Line 47, delete "made" and insert -- mate --

Column 9
Line 41, delete "made" and insert -- mate --

Column 10
Line 45, insert -- the -- before the word "spring"

Line 60, delete "are selected"

Signed and Sealed this

Thirty-first Day of July, 2007

JON W. DUDAS
*Director of the United States Patent and Trademark Office*